United States Patent [19]

Garg et al.

[11] Patent Number: 5,320,818
[45] Date of Patent: Jun. 14, 1994

[54] DEOXYGENATION OF NON-CRYOGENICALLY PRODUCED NITROGEN WITH A HYDROCARBON

[75] Inventors: Diwakar Garg, Macungie; Brian B. Bonner, Nesqueshoning; Donald P. Eichelberger, Macungie, all of Pa.

[73] Assignee: Air Products and Chemicals, Inc., Allentown, Pa.

[21] Appl. No.: 995,601

[22] Filed: Dec. 22, 1992

[51] Int. Cl.$^5$ ............................................. C01B 21/00
[52] U.S. Cl. ..................................... 423/351; 148/206; 148/230
[58] Field of Search ................ 423/351; 148/206, 230

[56] References Cited

U.S. PATENT DOCUMENTS

| | | | |
|---|---|---|---|
| 3,535,074 | 10/1970 | Nakashima | 23/2 |
| 4,713,224 | 12/1987 | Tamhanker et al. | 423/219 |
| 4,859,434 | 8/1989 | Roberts et al. | 423/219 |
| 4,859,435 | 8/1989 | Roberts et al. | 423/219 |
| 4,931,070 | 6/1990 | Prasad | 55/16 |
| 4,960,579 | 10/1990 | Campbell | 423/351 |
| 5,004,482 | 4/1991 | Haas et al. | 55/16 |
| 5,004,489 | 4/1991 | Rotman et al. | 65/32.2 |
| 5,057,164 | 10/1991 | Nilsson et al. | 148/16 |
| 5,069,728 | 12/1991 | Rancon et al. | 148/16 |
| 5,242,509 | 9/1993 | Rancon et al. | 148/206 |

FOREIGN PATENT DOCUMENTS

| | | |
|---|---|---|
| 4556189 | 11/1989 | Australia . |
| 4556289 | 11/1989 | Australia . |
| 2054036 | 4/1992 | Canada . |
| 0404496 | 6/1990 | European Pat. Off. . |
| 2639249 | 5/1990 | France . |
| 2639251 | 5/1990 | France . |

OTHER PUBLICATIONS

P. Murzyn and L. Flores, Jr., Carburizing with Membrane $N_2$: process and quality issues, Mar. 1988, pp. 28–32.

H. Walton, New Method of Generating Nitrogen for Controlled Atmosphere Heat Treatment at Torrington Shiloh Plant Mar. 1986 pp. 40–46.

P. F. Strutton, The Use of Non-Cryogenically Produced Nitrogen in Furnace Atmospheres, 1989, pp. 63–67.

D. J. Bowe & D. F. Fung, How PSA nitrogen works in a heat treating shop, pp. 30–33 (Mar. 1988).

BASF Technical Leaflet, BASF-Catalyst R3-11, Basic Chemicals (Apr., 1976).

Primary Examiner—Wayne Langel
Attorney, Agent, or Firm—James C. Simmon; William F. Marsh

[57] ABSTRACT

An improved process for deoxygenating non-cryogenically produced nitrogen with a hydrocarbon is disclosed. According to the process, non-cryogenically produced nitrogen stream containing residual oxygen impurity is 1) pre-heated, 2) mixed with a hydrocarbon, and 3) passed through a reactor packed with a platinum group of metal catalyst to reduce oxygen to very low levels by converting it to a mixture of carbon dioxide and moisture. The reactor effluent stream is optionally treated downstream to produce a nitrogen stream substantially free of moisture and carbon dioxide. The key features of the disclosed process include 1) pre-heating non-cryogenically produced nitrogen containing residual oxygen to a certain minimum temperature, 2) adding more than stoichiometric amount of a hydrocarbon to the pre-heated nitrogen stream, and 3) using a platinum group of metal catalyst to initiate and sustain the reaction between oxygen and hydrocarbon.

8 Claims, No Drawings

DEOXYGENATION OF NON-CRYOGENICALLY PRODUCED NITROGEN WITH A HYDROCARBON

FIELD OF THE INVENTION

The present invention pertains to utilization of non-cryogenically produced nitrogen containing oxygen.

BACKGROUND OF THE INVENTION

Inert gases such as nitrogen, argon, helium, and the like are widely employed by industries to protect materials from exposure to oxidizing environment. For example, inert gases such as argon, nitrogen, and helium are commonly used today to shield materials during welding, spraying metallic and ceramic materials by thermal and plasma techniques, depositing coatings by chemical vapor and physical vapor deposition techniques, and melting and refining ferrous and non-ferrous metals and alloys. They are also used to provide inert atmosphere for processing composites, semiconductor materials, and chemicals, packaging electronics and food products, removing dissolved gases from chemicals, fruit juices and edible oils, vulcanizing rubber and curing tires, and heat treating ferrous and non-ferrous metals and alloys, ceramics, composites, and metal matrix materials. Inert gases used in these applications are required to be as pure as possible. They are also required to be substantially free of oxygen because the presence of oxygen as an impurity results in oxidation of the processed materials.

A major portion of nitrogen used in above applications has been produced by distillation of air in large cryogenic plants. The cryogenically produced nitrogen is generally very pure (contains less than 10 ppm by volume residual oxygen) and expensive. To reduce the cost of nitrogen, several non-cryogenic air separation techniques such as adsorption and permeation have been recently developed and introduced in the market. The non-cryogenically produced nitrogen is much less expensive, but it contains a considerably higher level of residual oxygen (0.1 to 5.4 by volume) than that produced cryogenically, making a direct substitution of cryogenically produced nitrogen with non-cryogenically produced nitrogen in processing oxygen sensitive materials very difficult if not impossible.

Several processes have been developed and used commercially today to remove oxygen from inert gases prior to using them in processing oxygensensitive materials. For example, Cu/CuO and Ni/NiO based catalysts have been developed and used extensively to chemically scavenge residual oxygen from inert gases. These systems generally remove oxygen by absorbing it on metals highly dispersed on an inert support. They require frequent regeneration at high temperature with hydrogen, and are used in cyclic fashion, i.e. absorption followed by regeneration. These catalyst systems are described in detail in BASF Technical Leaflet on BASF-Catalyst R3-11 and U.S. Pat. No. 4,713,224. Since the oxygen absorption capacity of these catalyst systems is limited, they are generally used to purify inert gases containing less than 1,000 ppm or 0.14 by volume residual oxygen. They are not economically attractive to remove residual oxygen from nitrogen streams generated by non-cryogenic air separation techniques.

Another process that has been developed and commercially used today by industries involves converting residual oxygen to moisture with expensive hydrogen over a platinum group metal catalyst. It requires use of more than a stoichiometric amount of hydrogen for converting residual oxygen to moisture. The treated inert gas stream is optionally processed further to remove moisture, thereby producing dry, oxygen-free inert gas stream. This catalytic process is disclosed in U.S. Pat. Nos. 3,535,074, 4,931,070, 5,004,482 and 5,004,489. Since hydrogen required for converting oxygen to moisture is expensive, this process is generally used to purify inert gases containing up to 1,0001ppm or 0.1% by volume residual oxygen. It can, however, be used to purify non-cryogenically produced nitrogen in countries where hydrogen is readily available at low cost.

U.S. Pat. No. 3,535,074 discloses a process for removing residual oxygen by reacting it with hydrogen over a platinum group metal catalyst followed by absorption of unreacted oxygen with Cu/CuO or Ni/NiO based catalyst. This process is most suitable for producing inert gases, free of both residual oxygen and unconverted hydrogen, generally required for processing semiconductor materials. It is an expensive process, and is generally used to purify inert gases containing less than 1,000PPM or 0.1% by volume residual oxygen. It is not economical to use this process for purifying non-cryogenically produced nitrogen. n U.S. Pat. No. 4,859,435 discloses a process for removing minor amounts of oxygen from inert gas streams to result in very low levels of oxygen contamination in such inert gas streams. According to the Patent, residual oxygen is removed by reacting it with stoichiometric amount of methanol over a platinum group metal catalyst. The treated inert gas stream is optionally processed further to remove moisture and carbon dioxide, thereby producing dry, carbon dioxide-free and oxygen-free inert gas stream. This process is most suitable for removing oxygen from non-cryogenically produced nitrogen. However, it has not been used in many parts of the world because of the costs involved in installing methanol delivery system.

Based upon the above discussion, it is clear that there is a need to develop a process for removing residual oxygen inexpensively from non-cryogenically produced nitrogen. Additionally, there is a need to develop a process which eliminates need of both expensive hydrogen and an auxiliary system for delivering methanol.

SUMMARY OF THE INVENTION

According to the present invention a process has been developed by 1) heating non-cryogenically produced nitrogen to a certain minimum temperature, 2) mixing the heated nitrogen stream with more than stoichiometric amount of a hydrocarbon, and 3) passing the mixture through a reactor packed with a platinum group of metal catalyst to convert residual oxygen present in the non-cryogenically produced nitrogen to a mixture of carbon dioxide and moisture. The treated stream is optionally processed downstream to remove carbon dioxide and moisture, producing a nitrogen stream substantially free of carbon dioxide and moisture.

The present invention provides an improved and economical process for removing residual oxygen present in non-cryogenically produced nitrogen stream with a hydrocarbon.

In particular, a non-cryogenically produced nitrogen stream containing up to 5% residual oxygen is treated to remove oxygen by 1) heating the nitrogen stream to a temperature varying from about 200° to 400° C., 2) mixing the heated nitrogen stream with more than stoichiometric amount of a hydrocarbon required for converting completely residual oxygen to a mixture of carbon dioxide and moisture, and 3) passing the mixture through a reactor packed with a platinum group of metal catalyst to convert residual oxygen present in the nitrogen stream a mixture of carbon dioxide and moisture.

According to one embodiment of the process, the treated nitrogen stream containing carbon dioxide and moisture is processed further downstream to remove moisture. For example, the treated nitrogen stream is cooled to condense a part of moisture and then passed either through a bed of alumina or zeolite or through a selective membrane to remove moisture.

According to another embodiment of the process, the treated nitrogen stream containing carbon dioxide and moisture is processed further downstream to remove carbon dioxide and a part of moisture. For example, the treated nitrogen stream is cooled to condense a part of moisture and then passed either through a bed of molecular sieve or through a selective membrane to remove carbon dioxide.

According to another embodiment of the process, the treated nitrogen stream containing carbon dioxide and moisture is processed further downstream to remove both moisture and carbon dioxide. For example, the treated nitrogen stream is cooled to condense a part of moisture, passed through a bed of alumina or zeolite to remove moisture, and then passed through a bed of molecular sieve to remove carbon dioxide. Alternatively, a selective membrane can be used to remove both moisture and carbon dioxide.

DETAILED DESCRIPTION OF THE INVENTION

The process of the present invention is based on a surprising discovery that residual oxygen present in non-cryogenically produced nitrogen can be reduced to very low levels by 1) pre-heating non-cryogenically produced nitrogen containing up to 5% residual oxygen to a certain minimum temperature, 2) mixing the heated nitrogen stream with more than stoichiometric amount of a hydrocarbon, and 3) passing the mixture through a reactor packed with a platinum group of metal catalyst to convert residual oxygen present in the non-cryogenically produced nitrogen to a mixture of carbon dioxide and moisture.

Several processes have been developed and used today to purify inert gases such as helium, argon, nitrogen, etc. These processes utilize either chemical agents that absorb oxygen or reducing agents that react with oxygen. Chemical agents such as Cu and Ni are very effective to absorb oxygen, but they have limited capacity. They require frequent regeneration at high temperature with expensive hydrogen. Reducing agents such as hydrogen and methanol are quite effective in converting oxygen to moisture or a mixture of carbon dioxide and moisture, but they are either very expensive, not available in many parts of the world, or require expensive delivery system. Therefore, there is a need to develop an inexpensive process for removing oxygen from non-cryogenically produced nitrogen stream.

According to the present invention residual oxygen present in non-cryogenically produced nitrogen is reduced to a very low levels inexpensively by 1) pre-heating non-cryogenically produced nitrogen containing up to 5% residual oxygen to a certain minimum temperature, 2) mixing the heated nitrogen stream with more than stoichiometric amount of a hydrocarbon, and 3) passing the mixture through a reactor packed with a platinum group of metal catalyst to convert residual oxygen to a mixture of carbon dioxide and moisture. The function of metal catalyst is to convert residual oxygen present in non-cryogenically produced nitrogen with a hydrocarbon to a mixture of carbon dioxide and moisture and produce a treated stream with less than 10 ppm oxygen.

The residual oxygen in non-cryogenically produced nitrogen for the process of the present invention can vary from 0.054 to about 54. It can preferably vary from about 0.14 to about 24. More preferably, it can vary from about 0.2% to about 1.0%.

Non-cryogenically produced nitrogen stream is pre-heated to a temperature from about 200° to 400° C., preferably, to a temperature varying from about 225° to about 350° C. The pre-heating temperature required depends on the reactivity and nature of hydrocarbon used. For example, the pre-heating temperature required with propane is considerably lower than the one required with methane or natural gas. Since the reaction between residual oxygen and a hydrocarbon is exothermic in nature, it is advisable to limit the pre-heating temperature to below about 400° C. to avoid thermal cracking of hydrocarbon and deposition of coke on the catalyst. Instead of pre-heating feed gas, the catalytic reactor can be heated directly to the desired temperature.

A heat exchanger can optionally be used to recover a portion of sensible heat from the reactor effluent stream to pre-heat feed gas prior to introducing it either to a pre-heater or a catalytic reactor to improve overall process economics.

The amount of a hydrocarbon required for converting residual oxygen to a mixture of carbon dioxide and moisture in the presence of a platinum group metal catalyst is more than the stoichiometric amount required for complete conversion of oxygen to a mixture of carbon dioxide and moisture. It is advisable not to use too much excess hydrocarbon to avoid thermal cracking of hydrocarbon and deposition of coke on the catalyst.

The hydrocarbon can be selected from alkanes such as methane, ethane, propane, and butane and alkenes such as ethylene, propylene, and butene. Commercial feedstocks such as natural gas, petroleum gas, cooking gas, coke oven gas, and town gas can also be used as a hydrocarbon.

The catalytic reactor is packed with a precious metal catalyst supported on a high surface area support material made of alumina, magnesia, zirconia, silica, titania, or mixtures thereof. The precious metal catalyst can be selected from platinum group metals such as platinum, palladium, rhodium, ruthenium, iridium, osmium, or mixtures thereof. The metal concentration in the catalyst can vary from about 0.05 to about 1.0% by weight. Preferably, the metal concentration is between 0.2 to 0.5% and is palladium, platinum, or mixtures thereof supported on a high surface area alumina. Metal catalyst can be shaped in the form of pellets or balls. Commercially available palladium and platinum metal based catalysts such as Type 30196-29 supplied by GPT, Inc., Manalapan, N.J., RO-20, RO-21, and RO-22 supplied by BASF Corporation, Parsippany, N.J., and Type 48, 50, 50A, 50B, 54, and 73 supplied by Johnson Matthey, Wayne, Pa. can also be used for deoxygenating a nitrogen stream.

The precious metal catalyst can optionally be supported on a metallic or a ceramic honeycomb structure to avoid problems related to pressure drop through the reactor. Once again the precious metal supported on these structures can be selected from platinum group metals such as platinum, palladium, rhodium, ruthenium, iridium, osmium, or mixtures thereof. The metal concentration in the catalyst can vary from about 0.05 to about 1.0% by weight. Preferably, the metal concentration is between 0.2 to 0.5% and is palladium, platinum, or mixtures thereof supported on a honeycomb structure. The honeycomb structure can be similar to the one described in a technical brochure "VOC destruction through catalytic incineration" published by Johnson Matthey, Wayne Pennsylvania. It can also be similar to the ones described in technical brochures "High Performance Catalytic Converters With Metal Cores" published by Camet Co., Hiram, Ohio and "Celcor (registered trade mark of Corning, Inc.) Honeycomb Catalysts Support" published by Corning, N.Y.

The hourly flow rate of gaseous mixture flowing through the catalytic reactor can vary from about 100 to 50,000 times the volume of the reactor. It can preferably vary from about 1,000 to 20,000 times the volume of the reactor. More preferably, it can vary from about 2,000 to 10,000 times the volume of the reactor.

The effluent gas from the catalytic reactor contains the original nitrogen gas, less than 10 ppm oxygen, unreacted hydrocarbon, and up to several wt% each of carbon dioxide and moisture depending on the level of residual oxygen in the feed nitrogen gas. Under some circumstances, for instance in annealing and sintering non-ferrous metals and alloys, oxide and decarburize annealing carbon steels, vulcanizing rubber, curing tires, removing dissolved gases from chemicals, processing and storing food, curing epoxy materials, selective inerting applications, etc., the reactor effluent gas can be used directly without removing unreacted hydrocarbon, carbon dioxide and moisture. In many applications, for instance neutral hardening of steels, sintering powder metal parts, curing epoxy materials, selective inetting applications, etc., the reactor effluent gas can be used with only partial removal of moisture. The partial removal of moisture can be accomplished by known means. For example, the treated stream can be cooled to condense and remove a part of the moisture. In many other applications, carbon dioxide and/or moisture must be removed before the treated gas can be utilized further. The removal of water and/or carbon dioxide can be accomplished by known means. Moisture is removed by cooling the reactor effluent stream to condense a portion of moisture and then passing the gas stream through a bed of sorbent, such as alumina or zeolite, to adsorb the remaining moisture. The sorbent is periodically regenerated by passing a purge stream through the bed at either elevated temperature (thermal regeneration or temperature swing regeneration) or reduced pressure (pressure swing regeneration). Carbon dioxide can be removed by first cooling the reactor effluent stream to condense a portion of moisture and then passing the gas stream through a bed of molecular sieve, such as 13X, to adsorb carbon dioxide. The sorbent is once again periodically regenerated by temperature swing or pressure swing regeneration techniques. If removal of both carbon dioxide and moisture is required, the reactor effluent gas is first cooled to condense a portion of the moisture and then a single bed or two beds of adsorbents can be used to remove carbon dioxide and the remaining moisture by proper selection of the adsorbent or adsorbents and regeneration techniques. Selective membranes can also be used to remove moisture and/or carbon dioxide.

Two different catalytic reactors were used to demonstrate the present invention. A small 1 in. diameter reactor with approximately 0.005 $ft^3$ of precious metal catalyst was used initially to study the reaction between oxygen present in feed nitrogen and a hydrocarbon. The feed gas was heated either by passing through a pre-heater or by heat applied directly to the reactor. A 3 in. diameter scaled up reactor with 0.0736 $ft^3$ of catalyst was used to demonstrate the present invention on a larger scale.

A series of experiments were conducted using the 1 in. diameter reactor containing the catalyst supported in a metallic honeycomb where natural gas was the reactant. These tests are summarized in the following tables and text.

TABLE 1

| | Example 1 | | | Example 1B | | | Example 1C | | Example 1D | | Example 1E | |
|---|---|---|---|---|---|---|---|---|---|---|---|---|
| Flow Rate of Feed Gas, SCFH | 50 | | | 50 | | | 50 | | 50 | | 50 | |
| Composition of Feed Gas | | | | | | | | | | | | |
| Nitrogen, % | 99.5 | | | 99.5 | | | 99.5 | | 99.5 | | 99.5 | |
| Oxygen, % | 0.5 | | | 0.5 | | | 0.5 | | 0.5 | | 0.5 | |
| Catalyst Type | (1) | | | (1) | | | (1) | | (1) | | (1) | |
| GHSV, l/h | 10,000 | | | 10,000 | | | 10,000 | | 10,000 | | 10,000 | |
| Amount of Natural Gas Added, % | 0.25 | | | 0.50 | | | 1.00 | | 1.50 | | 2.00 | |
| Feed Gas Temperature, °C. | 255 | 289 | 371 | 260 | 319 | 362 | 263 | 307 | 267 | 311 | 272 | 310 |
| Effluent Gas Composition | | | | | | | | | | | | |
| Oxygen, ppm | 3,930 | 1,200 | 922 | 3,370 | 32 | <5 | 2,590 | <9 | 1,250 | <7 | 484 | <5 |
| Carbon Dioxide, % | 0.05 | 0.19 | 0.20 | 0.08 | 0.25 | 0.25 | 0.12 | 0.25 | 0.19 | 0.25 | 0.23 | 0.25 |
| Dew Point, °C. | −20 | −5 | −5 | −15 | −2 | −2 | −11 | −2 | −5 | −2 | −3 | −2 |
| Methane, % | 0.22 | 0.06 | 0.04 | 0.42 | 0.25 | 0.25 | 0.88 | 0.75 | 1.31 | 1.25 | 1.77 | 1.75 |

(1) 0.2% Platinum supported on metallic honeycomb.

EXAMPLE 1A

A nitrogen stream containing 0.5% (5,000 ppm) oxygen was heated to the desired temperature using a pre-heater. It was then mixed with 0.25% natural gas (containing predominantly methane) and deoxygenated by passing the gaseous feed mixture through the 1 in. diameter catalytic reactor packed with 0.24 platinum metal catalyst supported on a metallic honeycomb structure with a cell density of approximately 200 cells/$in.^2$. The honeycomb catalyst was supplied by Johnson Matthey of Wayne, Pa. Composition of the nitrogen stream used in this example was similar to that commonly produced by non-cryogenic separation techniques. The amount of natural gas used was equal to the stoichiometric amount required to convert oxygen completely to a mixture of carbon dioxide and moisture. The hourly flow rate of nitrogen stream through the reactor was 10,000 times the volume of the catalyst in the reactor (Gas Hourly Space Velocity or GHSV of 10,000 1/h).

The feed gas was pre-heated to a temperature varying from 255° to about 371° C., as shown in Table 1. The effluent stream from the reactor contained more than 900 ppm oxygen when the feed gas was pre-heated to a temperature as high as 371° C. (see Table 1). This example showed that a feed gas temperature substantially greater than 371° C. is required to remove oxygen from nitrogen stream with a stoichiometric amount of natural gas.

EXAMPLE 1 B

The catalytic deoxygenation experiment described in Example 1A was repeated using the same reactor, type of catalyst, flow rate of nitrogen stream (or GHSV of 10,000 1/h), and composition of nitrogen stream with the exception of using 0.54 by volume natural gas. The amount of natural gas used was 2 times the stoichiometric amount required to convert oxygen completely to a mixture of carbon dioxide and moisture. The reactor effluent stream contained less than 5 ppm oxygen when the feed stream was pre-heated to about 362° C. temperature, as shown in Table 1. The residual oxygen was converted to a mixture of carbon dioxide and moisture. This example showed that a feed gas temperature close to 362° C. is required to remove oxygen from nitrogen stream with two times the stoichiometric amount of natural gas. This was an unexpected and significant finding.

EXAMPLE 1C

The catalytic deoxygenation experiment described in Example 1A was repeated using the same reactor, type of catalyst, flow rate of nitrogen stream (or GHSV of 10,000 1/h), and composition of nitrogen stream with the exception of using 1.0% by volume natural gas. The amount of natural gas used was 4 times the stoichiometric amount required to convert oxygen completely to a mixture of carbon dioxide and moisture. The reactor effluent stream contained less than 9 ppm oxygen when the feed stream was pre-heated to about 307° C. temperature, as shown in Table 1. This example showed that a feed gas temperature close to 310° C. is required to remove oxygen from nitrogen stream with four times the stoichiometric amount of natural gas. This is, once again, an unexpected and significant finding.

EXAMPLES 1D and 1E

The catalytic deoxygenation experiment described in Example 1A was repeated twice using the same reactor, type of catalyst, flow rate of nitrogen stream (or GHSV of 10,000 1/h), and composition of nitrogen stream with the exception of using 1.5% and 2.0% by volume natural gas, respectively. The amount of natural gas used in these examples was 6 and 8 times the stoichiometric amount required to convert oxygen completely to a mixture of carbon dioxide and moisture. The reactor effluent streams in these examples contained less than 7 ppm oxygen when the feed nitrogen stream was pre-heated to about 310° C. temperature, as shown in Table 1. These examples showed that a feed gas temperature close to 310° C. is required to remove oxygen from nitrogen stream with more than four times the stoichiometric amount of natural gas.

Examples 1A to 1E showed that platinum group of metals can be used to reduce oxygen level in the feed nitrogen stream to below 10 ppm level provided the feed stream is pre-heated to a temperature close to 310° C. and added with more than stoichiometric amount of natural gas.

Another series of tests using the I in. diameter reactor for deoxygenation were conducted with the results set out in the following table and text.

TABLE 2

|  | Example 2A | | | Example 2B | | |
|---|---|---|---|---|---|---|
| Flow Rate of Feed Gas, SCFH | 50 | | | 50 | | |
| Composition of Feed Gas | | | | | | |
| Nitrogen, % | 99.5 | | | 99.5 | | |
| Oxygen, % | 0.5 | | | 0.5 | | |
| Catalyst Type | (1) | | | (1) | | |
| GHSV, 1/h | 10,000 | | | 10,000 | | |
| Amount of Natural Gas Added, % | 1.5 | | | 2.0 | | |
| Feed Gas Temperature | Ambient | | | Ambient | | |
| Reactor Set-Point Temperature, °C. | 300 | 325 | 350 | 250 | 300 | 325 |
| Effluent Gas Composition | | | | | | |
| Oxygen, ppm | 60 | <8 | <5 | 510 | 14 | <6 |
| Carbon Dioxide, % | 0.25 | 0.25 | 0.25 | 0.24 | 0.25 | 0.25 |
| Dew Point, °C. | −2 | −2 | −2 | −2 | −2 | −2 |
| Methane, % | 1.25 | 1.25 | 1.25 | 1.76 | 1.75 | 1.75 |

(1) 0.2% Platinum supported metallic honeycomb

EXAMPLE 2A

The catalytic deoxygenation experiment described in Example 1A was repeated using the same reactor, type of catalyst, composition of nitrogen stream, and flow rate of nitrogen stream (or GHSV of 10,000 1/h) with the exception of using 1.5% by volume natural gas and introducing feed gas at ambient temperature. The reactor was heated to the desired temperature by wrapping a heating tape around the reactor vessel. The reactor temperature was controlled by placing a thermocouple in the mid-portion of the reactor. The amount of natural gas used in this example was 6 times the stoichiometric amount required to convert oxygen completely to a mixture of carbon dioxide and moisture.

The reactor was heated to a temperature varying from 300 to 350° C., as shown in Table 2. The reactor effluent stream contained about 60 ppm oxygen when it was operated at about 300° C. temperature, indicating that the reactor operating temperature is not high enough to reduce oxygen level in the effluent stream to below 10 ppm level (see Table 2). Oxygen level in the reactor effluent stream was less than 10 ppm when it was operated at a temperature close to 325° C. or higher, as shown in Table 2. This example showed that residual oxygen present in the feed nitrogen can be reduced to below 10 ppm level by using 6 times the stoichiometric amount of natural gas and directly heating the catalytic reactor to a temperature close to 325° C. or higher.

EXAMPLE 2B

The catalytic deoxygenation experiment described in Example 2A was repeated using the same reactor, type of catalyst, composition of nitrogen stream, and flow rate of nitrogen stream (or GHSV of 10,000 l/h) with the exception of using 2.0% by volume natural gas, as shown in Table 2. The amount of natural gas used was 8 times the stoichiometric amount required to convert oxygen completely to a mixture of carbon dioxide and moisture. This example also showed that a catalytic reactor can be heated directly to 325° C. temperature or higher to remove oxygen in feed nitrogen to below 10 ppm level with excessive use of natural gas (see Table 2).

The above Examples 2A and 2B showed that natural gas can be used to remove residual oxygen present in nitrogen to below 10 ppm level in the presence of a platinum group of metal catalyst provided that the catalytic reactor is heated directly to above 300° C. temperature and the amount of natural gas added to the feed gas is equal to or more than four times the stoichiometric amount required to convert oxygen completely to a mixture of carbon dioxide and moisture.

Long term catalytic deoxygenation of a nitrogen stream containing residual oxygen was carried out and the results set forth in the following table and text.

EXAMPLE 3B

The catalytic deoxygenation experiment described in Example 3A was repeated using the same reactor, type of catalyst, flow rate of nitrogen stream (or GHSV of 10,000 l/h), and composition of nitrogen stream with the exception of using 1.75% by volume natural gas. The amount of natural gas therefore was 7 times the stoichiometric amount. The feed gas was pre-heated to a temperature varying between 309° and 336° C., and the reactor was operated for 9 days without interruption. The oxygen level in the reactor effluent stream varied between 3 and 9 ppm, as shown in Table 3. This example once again showed that natural gas can be used to remove oxygen from nitrogen without poisoning platinum group of metal catalyst.

EXAMPLE 3C

The catalytic deoxygenation experiment described in Example 3A was repeated using the same reactor, type of catalyst, flow rate of nitrogen stream (or GHSV of 10,000 l/h), and composition of nitrogen stream with the exception of using 1.0% by volume natural gas. The amount of natural gas was 4 times the stoichiometric amount. The feed gas was pre-heated to a temperature varying between 310° and 355° C., and the reactor was operated for 8 days without interruption. The oxygen level in the reactor effluent stream varied between 4 and 7 ppm, as shown in Table 3. This example once again showed that natural gas can be used to remove oxygen from nitrogen without poisoning platinum group of metal catalyst.

EXAMPLE 3D

The catalytic deoxygenation experiment described in

TABLE 3

|  | Example 3A | Example 3B | Example 3C | Example 3D |
|---|---|---|---|---|
| Flow Rate of Feed Gas, SCFH | 50 | 50 | 50 | 50 |
| Composition of Feed Gas |  |  |  |  |
| Nitrogen, % | 99.5 | 99.5 | 99.5 | 99.5 |
| Oxygen, % | 0.5 | 0.5 | 0.5 | 0.5 |
| Catalyst Type | (1) | (1) | (1) | (1) |
| GHSV, l/h | 10,000 | 10,000 | 10,000 | 10,000 |
| Amount of Natural Gas Added, % | 2.0 | 1.75 | 1.00 | 0.75 |
| Feed Gas Temperature, °C. | 310–334 | 309–336 | 310–355 | 344–360 |
| Effluent Gas Oxygen Level, ppm | 2–6 | 3–9 | 4–7 | 3–8 |
| Test Duration, Days | 89 | 9 | 8 | 7 |

(1) 0.2% Platinum Supported metallic honeycomb

EXAMPLE 3A

A long term catalytic deoxygenation of a nitrogen stream containing 0.5% by volume oxygen was carried out using a similar reactor, type of catalyst, flow rate of nitrogen stream (or GHSV of 10,000 l/h), and composition of nitrogen stream as described in Example 1A. The feed nitrogen stream was mixed with 2.0% by volume natural gas. The amount of natural gas therefore was 8 times the stoichiometric amount. The feed gas was pre-heated to a temperature varying between 310° and 334° C., and the reactor was operated for 89 days without interruptions. The oxygen level in the reactor effluent stream varied between 2 and 6 ppm, as shown in Table 3. This example showed that natural gas can be used to remove oxygen from nitrogen without poisoning platinum group of metal catalyst.

Example 3A was repeated using the same reactor, type of catalyst, flow rate of nitrogen stream (or GHSV of 10,000 l/h), and composition of nitrogen stream with the exception of using 0.75% by volume natural gas. The amount of natural gas therefore was 3 times the stoichiometric amount. The feed gas was preheated to a temperature varying between 344° and 360° C., and the reactor was operated for 19 days without interruption. The oxygen level in the reactor effluent stream varied between 3 and 8 ppm, as shown in Table 3. This example once again showed that natural gas can be used to remove oxygen from nitrogen without poisoning platinum group of metal catalyst.

A series of experiments were conducted using the 1 in. diameter reactor containing the catalyst supported on alumina pellets with natural gas as the reactant and the results are set out in the following table and text.

TABLE 4

|  | Example 4A | | | | Example 4B | | | Example 4C | |
| --- | --- | --- | --- | --- | --- | --- | --- | --- | --- |
| Flow Rate of Feed Gas, SCFH | 50 | | | | 50 | | | 50 | |
| Composition of Feed Gas | | | | | | | | | |
| Nitrogen, % | 99.5 | | | | 99.5 | | | 99.5 | |
| Oxygen, % | 0.5 | | | | 0.5 | | | 0.5 | |
| Catalyst Type | 0.5% Palladium Supported on Alumina | | | | 0.5% Palladium Supported on Alumina | | | 0.5% Palladium Supported on Alumina | |
| GHSV, l/h | 10,000 | | | | 10,000 | | | 10,000 | |
| Amount of Natural Gas Added, % | 0.50 | | | | 1.0 | | | 1.50 | |
| Feed Gas Temperature, °C. | 172 | 310 | 345 | 413 | 244 | 316 | 351 | 316 | 350 |
| Effluent Gas Composition | | | | | | | | | |
| Oxygen, ppm | 5,000 | 3,830 | 2,690 | <6 | 4,890 | 2,980 | <3 | 2,470 | <3 |
| Carbon Dioxide, % | 0.0 | 0.07 | 0.12 | 0.25 | 0.01 | 0.11 | 0.25 | 0.13 | 0.25 |
| Dew Point, °C. | −58 | −18 | −8 | −2 | −42 | −12 | −2 | −10 | −2 |
| Methane, % | 0.50 | 0.43 | 0.35 | 0.25 | 0.98 | 0.90 | 0.75 | 1.35 | 1.25 |

EXAMPLE 4A

The catalytic deoxygenation experiment described in Example 1A was repeated using the same reactor design, composition of nitrogen stream, and flow rate of nitrogen (or GHSV of 10,000 1/h) with the exceptions of packing the reactor with 0.5% palladium metal catalyst supported on high surface area alumina pellets and using 0.54 natural gas, as shown in Table 4. The catalyst was supplied by Johnson Matthey of Wayne, Pennsylvania. The amount of natural gas used was two times the stoichiometric amount required to convert oxygen completely to a mixture of carbon dioxide and moisture.

The reactor effluent stream contained less than 6 ppm oxygen when the feed nitrogen stream was pre-heated to about 413° C. temperature. This example showed that a feed gas temperature close to 413° C. is required to remove oxygen from nitrogen stream with two times the stoichiometric amount of natural gas in the presence of a platinum group of metal catalyst supported on alumina.

EXAMPLES 4B and 4C

The catalytic deoxygenation experiment described in Example 4A was repeated twice using the same reactor, type of catalyst, flow rate of nitrogen stream (or GHSV of 10,000 1/h), and composition of nitrogen stream with the exception of using 1.04 and 1.54 by volume natural gas, respectively. The amount of natural gas used was 4 and 6 times the stoichiometric amount required to convert oxygen completely to a mixture of carbon dioxide and moisture. The reactor effluent stream contained less than 3 ppm oxygen when the feed nitrogen stream was pre-heated to about 350° C. temperature, as shown in Table 4. These examples showed that feed nitrogen stream can be pre-heated close to 350° C. temperature to reduce oxygen level below 10 ppm with four times the stoichiometric or higher amount of natural gas in the presence of a platinum group of metal catalyst supported on alumina.

Examples 4A to 4C showed that a platinum group of metal catalyst supported on a high surface area alumina can be used to reduce oxygen level in feed nitrogen stream by pre-heating the feed gas to about 350° C. and mixing it with about four times the stoichiometric amount of natural gas.

The following table and text summarizes experimental results using the i in. diameter reactor catalyst supported on a metallic honeycomb with propane as the reactant gas.

TABLE 5

|  | Example 5A | | | Example 5B | | Example 5C | |
| --- | --- | --- | --- | --- | --- | --- | --- |
| Flow Rate of Feed Gas, SCFH | 50 | | | 50 | | 50 | |
| Composition of Feed Gas | | | | | | | |
| Nitrogen, % | 99.5 | | | 99.5 | | 99.5 | |
| Oxygen, % | 0.5 | | | 0.5 | | 0.5 | |
| Catalyst Type | 0.2 Platinum/Palladium Supported on Metallic Honeycomb | | | 0.2 Platinum/Palladium Supported on Metallic Honeycomb | | 0.2 Platinum/Palladium Supported on Metallic Honeycomb | |
| GHSV, l/h | 10,000 | | | 10,000 | | 10,000 | |
| Amount of Propane Added, % | 0.13 | | | 0.24 | | 0.35 | |
| Feed Gas Temperature, °C. | 168 | 187 | 229 | 174 | 219 | 182 | 215 |
| Effluent Gas Oxygen Level, ppm | 4,600 | 2,790 | <4 | 2,090 | <3 | 617 | <4 |

EXAMPLE 5A

The catalytic deoxygenation experiment described in Example 1A was repeated using the same reactor, type of catalyst, composition of nitrogen stream, and flow rate of nitrogen (or GHSV of 10,000 1/h) with the exception of using 0.13% by volume propane. The amount of propane used was about 1.3 times the stoichiometric amount required to convert oxygen completely to a mixture of carbon dioxide and moisture.

The feed gas was pre-heated to a temperature varying from 168° to about 229° C., as shown in Table 5. The effluent gas from the reactor contained more than 2,500 ppm oxygen when feed gas was pre-heated to a temperature close to 187° C. It, however, contained less than 4 ppm oxygen when feed gas was pre-heated to about 229° C. temperature, as shown in Table 5. This example showed that feed nitrogen needs to be pre-heated close to 229° C. to reduce oxygen level below 10 ppm with slightly more than stoichiometric amount of propane. This is an unexpected and significant finding.

EXAMPLES 5B and 5C

The catalytic deoxygenation experiment described in Example 5A was repeated twice using the same reactor, type of catalyst, flow rate of nitrogen stream (or GHSV of 10,000 l/h), and composition of nitrogen stream with the exception of using 0.244 and 0.354 by volume propane, respectively. The amount of propane used in these examples was 2.4 and 3.5 times the stoichiometric amount required to convert oxygen completely to a mixture of carbon dioxide and moisture. The reactor effluent stream contained less than 3 ppm oxygen when feed stream was pre-heated to about 219° C. temperature, as shown in Table 5. These examples showed that feed nitrogen needs to be pre-heated close to 220° C. temperature to reduce oxygen level below 10 ppm with more than two times the stoichiometric amount of propane. Table 6 and examples 6A, 6B and 6E record experimental results using propane as the reactant gas in the 1 in. diameter reactor with the catalyst supported on alumina pellets.

Examples 5A to 5C show that a platinum group metal catalyst supported on a metallic honeycomb can be used to reduce the oxygen level in a nitrogen stream by pre-heating the stream to a temperature about 220° C. and adding to the stream about 1 to 3 times the stoichiometric amount of propane required to convert the oxygen to a mixture of carbon dioxide and moisture.

Table 6 and the following text detail a series of deoxygenation trials in the 1 in. diameter reactor filled with a catalyst supported or alumina pellets where propane is the reactant gas.

trogen was pre-heated to about 301° C. temperature, as shown in Table 6. This example showed that feed nitrogen needs to be pre-heated close to 301° C. to reduce oxygen level below 10 ppm with more than stoichiometric amount of propane in the presence of platinum group metal catalyst supported on alumina.

EXAMPLES 6B and 6C

The catalytic deoxygenation experiment described in Example 6A was repeated twice using the same reactor, type of catalyst, flow rate of nitrogen stream (or GHSV of 10,000 l/h), and composition of nitrogen stream with the exception of using 0.244 and 0.354 by volume propane, respectively. The amount of propane used was 2.4 and 3.5 times the stoichiometric amount required to convert oxygen completely to a mixture of carbon dioxide and moisture. The reactor effluent gas contained less than 4 ppm oxygen when feed nitrogen was pre-heated to about 292° C. temperature, as shown in Table 6. These examples showed that feed nitrogen needs to be pre-heated close to 292° C. temperature to reduce oxygen level below 10 ppm with more than two times the stoichiometric amount of propane in the presence of platinum group metal catalyst supported on alumina.

Examples 5A to 5C and 6A to 6C showed that oxygen present in nitrogen can be removed with propane in the presence of a platinum group of metal catalyst pro-

TABLE 6

|  | Example 6A | | | Example 6B | | Example 6C | |
|---|---|---|---|---|---|---|---|
| Flow Rate of Feed Gas, SCFH | 50 | | | 50 | | 50 | |
| Composition of Feed Gas | | | | | | | |
| Nitrogen, % | 99.5 | | | 99.5 | | 99.5 | |
| Oxygen, % | 0.5 | | | 0.5 | | 0.5 | |
| Catalyst Type | 0.5% Palladium Supported on Alumina | | | 0.5% Palladium Supported on Alumina | | 0.5% Palladium Supported on Alumina | |
| GHSV, l/h | 10,000 | | | 10,000 | | 10,000 | |
| Amount of Propane Added, % | 0.13 | | | 0.24 | | 0.35 | |
| Feed Gas Temperature, °C. | 228 | 274 | 301 | 277 | 292 | 233 | 278 |
| Effluent Gas Oxygen Level, ppm | 4,680 | 3,560 | <3 | 2,100 | <2 | 4,280 | <4 |

EXAMPLE 6A

The catalytic deoxygenation experiment described in Example 4A was repeated using the same reactor, type of catalyst, composition of nitrogen stream, and flow rate of nitrogen (or GHSV of 10,000 l/h) with the exception of using 0.134 by volume propane. The amount of propane used was about 1.3 times the stoichiometric amount required to convert oxygen completely to a mixture of carbon dioxide and moisture.

The feed nitrogen stream was pre-heated to a temperature varying from 228° to about 301° C., as shown in Table 6. The effluent gas from the reactor contained more than 3,500 ppm oxygen when feed nitrogen was pre-heated to a temperature close to 274° C. It, however, contained less than 3 ppm oxygen when feed nivided more than stoichiometric amount of propane is used and feed gas is pre-heated to a temperature between 220° and about 300° C. These active propane is considerably lower than with natural gas (compare Examples 1A to 1D with Examples 6A to 6C).

A further series of experiments were conducted using a 3 in. diameter reactor with a catalyst supported on alumina pellets (examples 7A, 7B, 7C) or a metallic honeycomb (example 8) with natural gas as the reactant. The results are summarized in the following table and text.

TABLE 7

|  | Example 7A | Example 7B | Example 7C | Example 8 |
|---|---|---|---|---|
| Flow Rate of Feed Gas, SCFH | 350 | 350 | 350 | 350 |
| Composition of Feed Gas | | | | |
| Nitrogen, % | 99.5 | 99.5 | 99.5 | 99.5 |
| Oxygen, % | 0.5 | 0.5 | 0.5 | 0.5 |
| Catalyst Type | (1) | (1) | (1) | (2) |
| GHSV, l/h | 4,750 | 4,750 | 5,440 | 4,750 |
| Amount of Natural Gas Added, % | 1.5 | 2.0 | 2.0 | 0.5 |
| Feed Gas Temperature, °C. | 330 | 320–330 | 320–330 | 320 |
| Effluent Gas Oxygen Level, ppm | <2 | <4 | <4 | <7 |

(1) 0.5% Palladium supported by alumina.
(2) 0.5% Platinum/0.5% Palladium supported on a metallic honeycomb.

EXAMPLE 7A

A nitrogen stream containing 0.5% (5,000 ppm) oxygen was pre-heated to a temperature close to 330° C. It was then mixed with 1.5% natural gas (containing predominantly methane) and deoxygenated by passing through a 3" diameter reactor packed with 0.5% palladium metal catalyst supported on high surface area alumina pellets. The catalyst was supplied by Johnson Matthey of Wayne, Pa. The amount of natural gas used was six times the stoichiometric amount required to convert oxygen completely to a mixture of carbon dioxide and moisture. The hourly flow rate of nitrogen stream through the reactor was 4,750 times the volume of the reactor (Gas Hourly Space Velocity or GHSV of 4,750 1/h), as shown in Table 7. The effluent gas from the reactor contained less than 2 ppm oxygen. This example showed that feed nitrogen needs to be pre-heated to about 330° C. to reduce oxygen level below 10 ppm with natural gas in the presence of a platinum group metal catalyst supported on alumina.

EXAMPLE 7B

The catalytic deoxygenation experiment described in Example 7A was repeated using the same reactor, type of catalyst, flow rate of nitrogen stream (or GHSV of 4,750 1/h), and composition of nitrogen stream with the exceptions of pre-heating the feed stream to a temperature varying between 20° and 330° C. and using 2.04 by volume natural gas. The amount of natural gas used was eight times the stoichiometric amount required to convert oxygen completely to a mixture of carbon dioxide and moisture. The reactor effluent gas contained less than 4 ppm oxygen. This example, once again, showed that feed nitrogen needs to be pre-heated to about 330° C. to reduce oxygen level below 10 ppm with natural gas in the presence of a platinum group metal catalyst supported on alumina.

EXAMPLE 7C

The catalytic deoxygenation experiment described in Example 7B was repeated using the same reactor, type of catalyst, gas temperature, amount of natural gas added, and composition of nitrogen stream with the exception of flowing nitrogen stream at 400 SCFH (or 5,440 GHSV), as shown in Table 7. The reactor effluent gas contained less than 4 ppm oxygen. This example showed that feed nitrogen needs to be pre-heated to about 330° C. temperature to reduce oxygen level below 10 ppm with natural gas.

EXAMPLE 8

The catalytic deoxygenation experiment described in Example 7B was repeated using a similar reactor, composition of nitrogen stream, and flow rate of nitrogen stream (or GHSV of 4,750 1/h) with the exceptions of pre-heating the feed nitrogen to 320° C. temperature, adding 0.5% natural gas, and using 0.5% platinum plus palladium metal catalyst supported on a metallic honeycomb support, as shown in Table 7. The catalyst was supplied by Johnson Matthey of Wayne, Pa. The reactor effluent gas contained less than 7 ppm oxygen (see Table 7). This example showed that feed nitrogen needs to pre-heated to about 320° C. to reduce oxygen level below 10 ppm with natural gas in the presence of a platinum group of metal catalyst supported on a metallic honeycomb structure.

Table 8 and examples 9A and 9B summarize the results of test using the 3in. diameter reactor, alumina pellet supported catalyst and propane as the reactant gas.

TABLE 8

|  | Example 9A | Example 9B |
| --- | --- | --- |
| Flow Rate of Feed Gas, SCFH | 350 | 350 |
| Composition of Feed Gas |  |  |
| Nitrogen, % | 99.5 | 99.5 |
| Oxygen, % | 0.5 | 0.5 |
| Catalyst Type | (1) | (1) |
| GHSV, 1/h | 4,750 | 4,750 |
| Amount of Propane Added, % | 0.24 | 0.35 |
| Feed Gas Temperature, °C. | 277 | 277 |
| Effluent Gas Oxygen Level, ppm | <2 | <2 |

(1) 0.5% Palladium supported on alumina.

EXAMPLE 9A

A nitrogen stream containing 0.5% (5,000 ppm) oxygen was pre-heated to a temperature close to 277° C. It was then mixed with 0.244 propane and deoxygenated by passing through a 3" diameter reactor packed with 0.54 palladium metal catalyst supported on high surface area pellets. The catalyst was supplied by Johnson Matthey of Wayne, Pa. The amount of propane used was 2.4 times the stoichiometric amount required to convert oxygen completely to a mixture of carbon dioxide and moisture. The hourly flow rate of nitrogen stream through the reactor was 4,750 times the volume of the reactor (Gas Hourly Space Velocity or GHSV of 4,750 1/h), as shown in Table 8. The reactor effluent gas contained less than 2 ppm oxygen. This example showed that feed nitrogen needs to be pre-heated to about 277° C. to reduce oxygen level below 10 ppm with propane in the presence of a platinum group of metal catalyst supported on alumina.

EXAMPLE 9B

The catalytic deoxygenation experiment described in Example 9A was repeated using the same reactor, type of catalyst, flow rate of nitrogen stream (or GHSV of 4,750 1/h), and composition of nitrogen stream with the exception of using 0.354 by volume propane. The amount of propane used was 3.5 times the stoichiometric amount required to convert oxygen completely to a mixture of carbon dioxide and moisture. The reactor effluent gas contained less than 2 ppm oxygen. This example showed that feed nitrogen needs to be pre-heated to about 277° C. to reduce oxygen level below 10 ppm with propane in the presence of a platinum group of metal catalyst supported on alumina.

Having thus described our invention what is desired to be secured by Letters Patent of the United States is set forth in the following claims.

We claim:

1. A process for reducing the level of residual oxygen in non-cryogenically produced nitrogen stream comprising the steps of:

mixing the non-cryogenically produced nitrogen stream with a hydrocarbon gas, said hydrocarbon gas present in an amount in excess of that required for stoichiometric conversion of oxygen contained in said nitrogen stream;

passing said mixture over a platinum group metal catalyst in an environment where said mixture is heated to a temperature of between 200° C. and less than 400° C.; and recovering a gaseous effluent stream consisting essentially of nitrogen containing carbon dioxide, moisture, unreacted hydrocarbons and less than 10 ppm oxygen.

2. A process according to claim 1 wherein the effluent is heat exchanged with the non-cryogenically produced nitrogen stream to effect at least partial pre-heating of the non-cryogenically produced nitrogen stream.

3. A process according to claim 1 wherein the effluent is further treated to partially remove remedial moisture.

4. A process according to claim 1 wherein the effluent is further treated to remove moisture and carbon dioxide.

5. A process according to claim 1 wherein the hydrocarbon gas is selected from the group consisting of methane, ethane, propane, butane, ethylene, propylene, butene and mixtures thereof.

6. A process according to claim 1 wherein the catalyst is selected from the group consisting of supported platinum, palladium or mixture thereof when the metal concentration is between 0.05 and 1.0 per unit by weight.

7. A process according to claim 1 wherein the effluent is used as inerting medium where the presence of unreacted hydrocarbon, carbon dioxide and moisture in the nitrogen will not affect the inerting properties of the nitrogen.

8. A process according to claim 1 wherein the amount of excess hydrocarbon mixed with the non-cryogenically produced nitrogen controlled to prevent thermal cracking of the hydrocarbon and deposition of coke on the catalyst.

* * * * *